No. 840,381. PATENTED JAN. 1, 1907.
T. T. SAWDON.
OIL FILTER.
APPLICATION FILED JUNE 7, 1906.
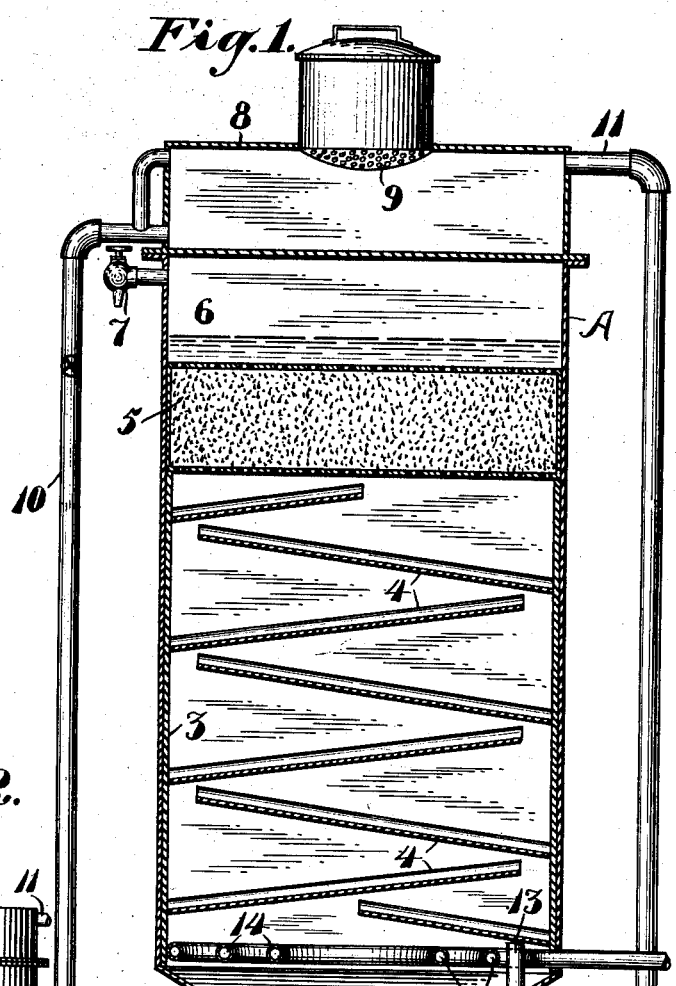
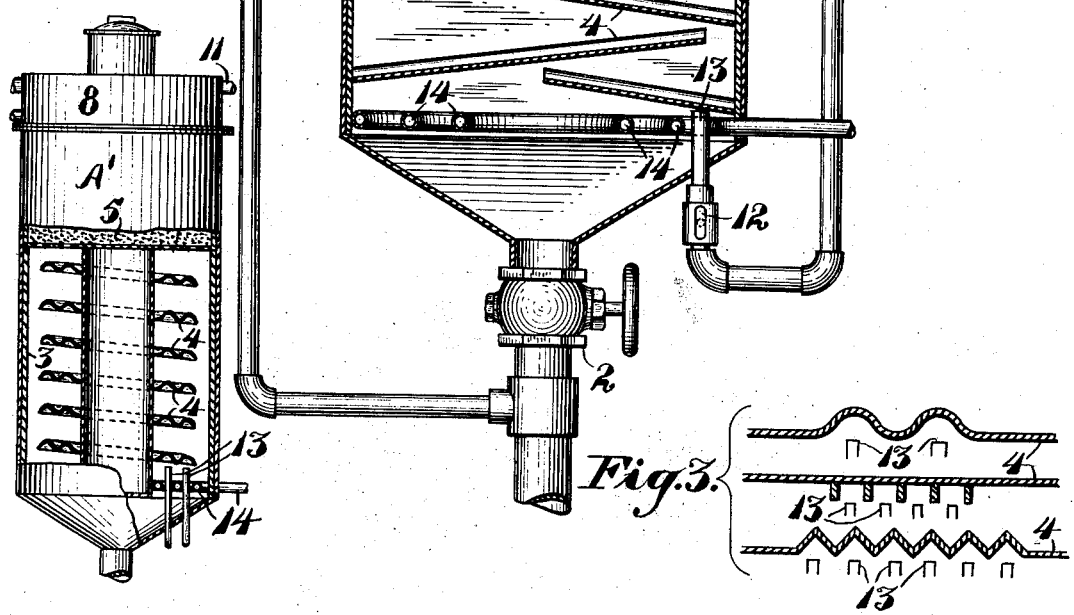
Witnesses:— Inventor:
F. C. Fliedner Thomas T. Sawdon
By Geo. H. Strong. Atty.

UNITED STATES PATENT OFFICE.

THOMAS T. SAWDON, OF SAN FRANCISCO, CALIFORNIA.

OIL-FILTER.

No. 840,381. Specification of Letters Patent. Patented Jan. 1, 1907.

Application filed June 7, 1906. Serial No. 320,631.

*To all whom it may concern:*

Be it known that I, THOMAS T. SAWDON, a citizen of the United States, residing in the city and county of San Francisco and State of California, have invented new and useful Improvements in Oil-Filters, of which the following is a specification.

My invention relates to oil-filtering apparatus.

Its object is to provide a simple, practical, and efficient filter for use particularly on shipboard, where prevailing conditions due to the pitching of the vessel render most filters useless.

The invention comprehends, essentially, the liberation of the oil drop by drop at the bottom of a tank filled with water or other suitable cleansing liquid and the rolling of these drops over and over along a suitable inclined surface or surfaces and within suitable guiding-channels in the effort of the oil to reach the top, this rolling action of the oil serving to work out foreign matters and to leave the oil finally collected at the top after passing through suitable filtering media clean and ready for reuse.

Having reference to the accompanying drawings, Figure 1 is a sectional view of a preferred form of my apparatus. Fig. 2 shows a modification of the same. Fig. 3 represents various forms of corrugated or channeled baffle-plates.

A represents a tank of any suitable size, shape, and material. This tank has a tapered bottom with a sludge-cock 2 for drainage purposes. Within the tank fits a removable frame 3, carrying a series of staggered alternately arranged and inclined baffles 4. These baffles are preferably corrugated longitudinally to provide one or more underneath channels along which drops of oil are adapted to travel within defined limits in the effort of the oil to pass up through the water which is contained in the tank. These corrugations or channels may assume a variety of forms, as shown in Fig. 3.

5 is a filter-box removably fitting inside the tank above the baffles, and 6 is a reservoir-space for the clarified oil which has passed through the water in the tank and through the filter-box. There may be any desired number of filter-boxes, and they may be of any suitable construction and contain any desired or approved filtering medium. The reservoir 6 has a suitable draw-off cock 7.

8 is a closed-bottom pan fitting into the top of the tank and covering the same and adapted to receive the oil which is to be filtered.

9 is a strainer in the top of pan 8 to catch the solid foreign matters in the oil, and so prevent clogging of the passages in the apparatus.

The pan 8 has a valved draw-off pipe 10 at the bottom for the water and an oil-outlet pipe 11 near the top for the oil. From pan 8 the settled and strained oil passes through pipe 11 downward beneath the apparatus and then upward drop by drop through a sight-feed device 12 of well-known construction into the body of water contained in tank A. Each drop as it is liberated seeks an upward passage through the water; but before reaching the submerged filter-box it is made to roll over and over along the under side of the successive baffles.

There is a separate oil-inlet 13 with its individual sight-feed device 12 for each corrugation in a plate. Thus if the plates are provided with six underneath longitudinal channels there will be a separate oil-feed for each channel, and the drops of oil liberated by the several oil-feeding devices will travel throughout their course along the various baffles in separate channels. From this it will be seen that no matter how much the apparatus may be shaken by the tossing of the vessel this motion will have no effect on the movement of the oil through the water in tank A. Furthermore, by providing the channeled baffles I can increase the size and the consequent capacity of my device to any extent within practical limits. The length of time to which the oil is subjected to this rolling and scrubbing action depends on the length of the tank and the number of the baffles. In Fig. 2 I have shown the same principle of a multiple sight-feed applied to a cylindrical filter in which a longitudinally-corrugated helical baffle takes the place of a plurality of alternately-inclined straight baffles.

In both of the tanks A and A' of the respective figures it is designed to heat the water and the oil undergoing filtration by suitable means, as the steam-coils 14.

It is possible that various modifications in my invention may be made without departing from the principle thereof, and I do not wish to be understood necessarily as limiting myself to my specific construction.

Having thus described my invention, what I claim, and desire to secure by Letters Patent, is—

1. A filter comprising a tank to contain water, an inclined baffle submerged in the tank, said baffle having its under face corrugated to form a plurality of independent channels along which globules of oil will roll in their ascent through the water, and separate feeding means for the independent channels.

2. A filter comprising a tank to contain water, an inclined baffle submerged in the tank, said baffle having a plurality of independent non-communicating channels into which oil-globules are delivered and allowed to roll therealong, and a feeding device positioned relative to each channel.

3. A filter comprising a tank to contain water, a series of staggered, alternately arranged and inclined baffles submerged in the tank, each of said baffles having a plurality of channels, and means to admit oil drop by drop into the respective channels of the lowermost baffle, whereby the oil so admitted travels the length of the lowermost baffle and follows a defined path upward along the successive baffles.

4. A filter comprising a tank to contain water, a series of oppositely-inclined longitudinally-corrugated baffles within the tank arranged one above the other, and means for admitting oil separately into the several channels formed by said corrugations on the under side of the baffles, the channels in the several baffles being arranged in vertical series whereby a drop of oil entering one channel on the bottom baffle follows a defined path upward along the successive baffles.

5. A filter comprising a tank to contain water, a series of removable baffles arranged in alternately-inclined, superposed position, a submerged filter-box above the baffles, a collection-reservoir for the filtered oil, a reservoir above the filter-box for the oil to be filtered, an oil-feed connection between said reservoir for the unfiltered oil and the bottom of the tank and beneath the baffles, and means for regulating the admission of oil drop by drop into the tank.

In testimony whereof I have hereunto set my hand in presence of two subscribing witnesses.

THOMAS T. SAWDON.

Witnesses:
J. C. FITZSIMMONS,
C. E. ARNOLD.